US012670520B2

(12) United States Patent
Kirk et al.

(10) Patent No.: US 12,670,520 B2
(45) Date of Patent: Jun. 30, 2026

(54) ARTIFICIAL INTELLIGENCE SYSTEM FOR GRANULAR DIGITAL IDENTITY SELECTION

(71) Applicant: Wells Fargo Bank, N.A., San Francisco, CA (US)

(72) Inventors: Ann M. Kirk, Deerwood, MN (US); Matthew Carroll, Charlotte, NC (US); Marc Ward, Astoria, OR (US)

(73) Assignee: Wells Fargo Bank, N.A., San Francisco, CA (US)

( * ) Notice: Subject to any disclaimer, the term of this patent is extended or adjusted under 35 U.S.C. 154(b) by 171 days.

(21) Appl. No.: 18/545,466

(22) Filed: Dec. 19, 2023

(65) Prior Publication Data

US 2025/0200636 A1     Jun. 19, 2025

(51) Int. Cl.
*G06Q 30/00* (2023.01)
*G06Q 30/0601* (2023.01)
(52) U.S. Cl.
CPC ................................ *G06Q 30/0631* (2013.01)
(58) Field of Classification Search
CPC ................................................. G06Q 30/0631
See application file for complete search history.

(56) References Cited

U.S. PATENT DOCUMENTS 8,622,308 B1     1/2014  Field
2010/0257040 A1  10/2010  Hunt 2015/0073907 A1     3/2015  Purves
2017/0161728 A1     6/2017  Satyanarayan
2018/0308117 A1*   10/2018  Gupta ................ G06Q 30/0226
2020/0184446 A1     6/2020  Kadapurath
2022/0391872 A1*   12/2022  Sharma ................ G06Q 20/363
2023/0043702 A1*    2/2023  Sells ...................... G06Q 40/03

OTHER PUBLICATIONS

M. Alizadeh, K. Andersson and O. Schelén, "Comparative Analysis of Decentralized Identity Approaches," in IEEE Access, vol. 10, pp. 92273-92283, 2022, doi: 10.1109/ACCESS.2022.3202553. (Year: 2022).*

* cited by examiner

*Primary Examiner* — Anand Loharikar
(74) *Attorney, Agent, or Firm* — K&L Gates LLP

(57)     ABSTRACT

Systems, apparatuses, methods, and computer program products are disclosed for optimizing an item partitioning benefit. An example method includes detecting, by detection circuitry, a user visit event at an establishment that is associated with a user attribute set. The example method further includes determining, by a multimodal engine and based on the user attribute set, a user digital identity wallet comprising one or more user digital identities associated with a benefit set. The example method further includes, identifying, by a selection engine, one or more candidate items, and determining for each candidate item, by the selection engine and using a digital identity selection model, an optimal user digital identity indicative of an optimal item partitioning benefit. The example method further includes generating, by the selection engine and using the digital identity selection model, a candidate item partitioning set, and outputting, by communications hardware, a verification request.

20 Claims, 10 Drawing Sheets

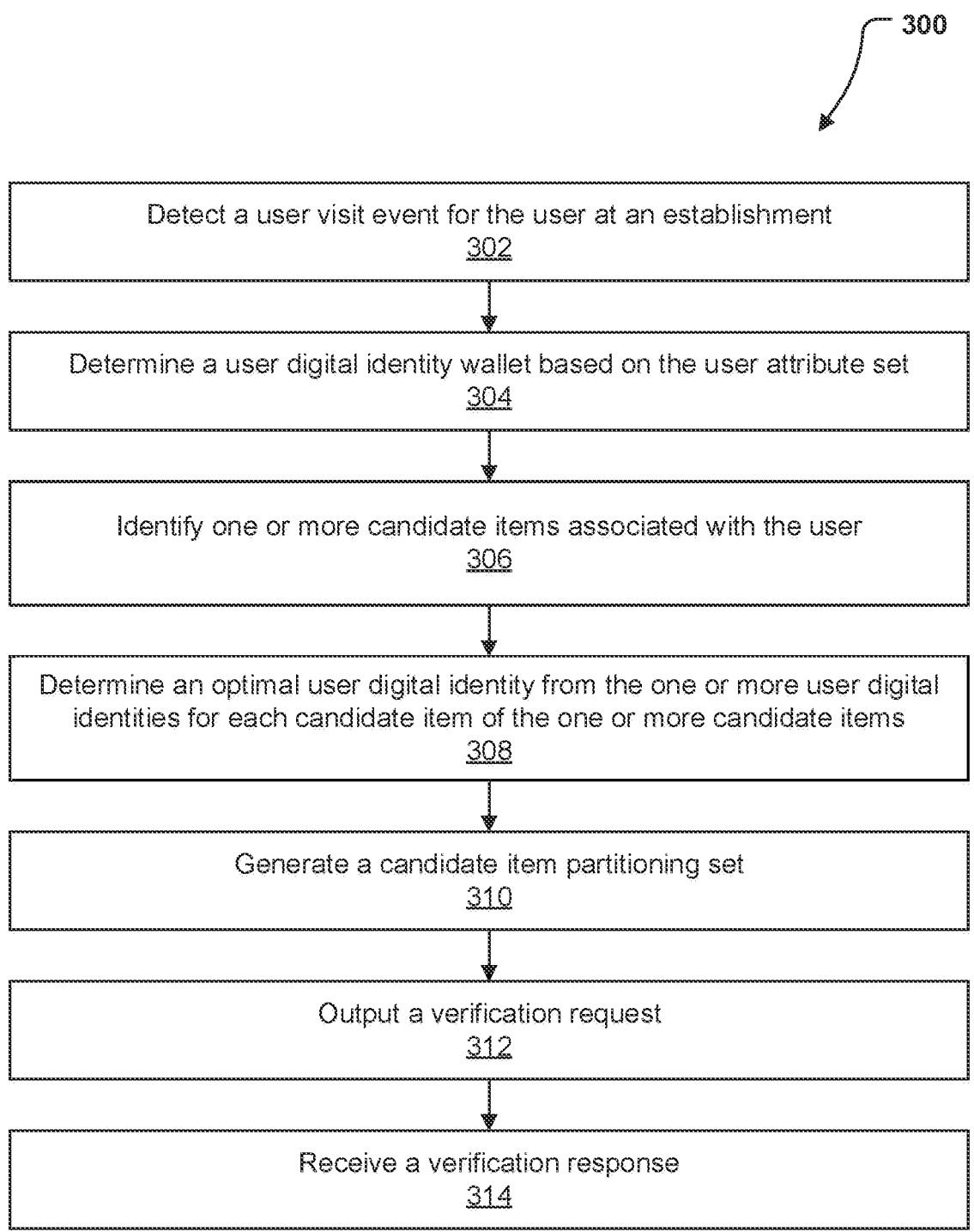

300

Detect a user visit event for the user at an establishment
302

Determine a user digital identity wallet based on the user attribute set
304

Identify one or more candidate items associated with the user
306

Determine an optimal user digital identity from the one or more user digital identities for each candidate item of the one or more candidate items
308

Generate a candidate item partitioning set
310

Output a verification request
312

Receive a verification response
314

FIG. 3

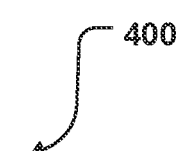
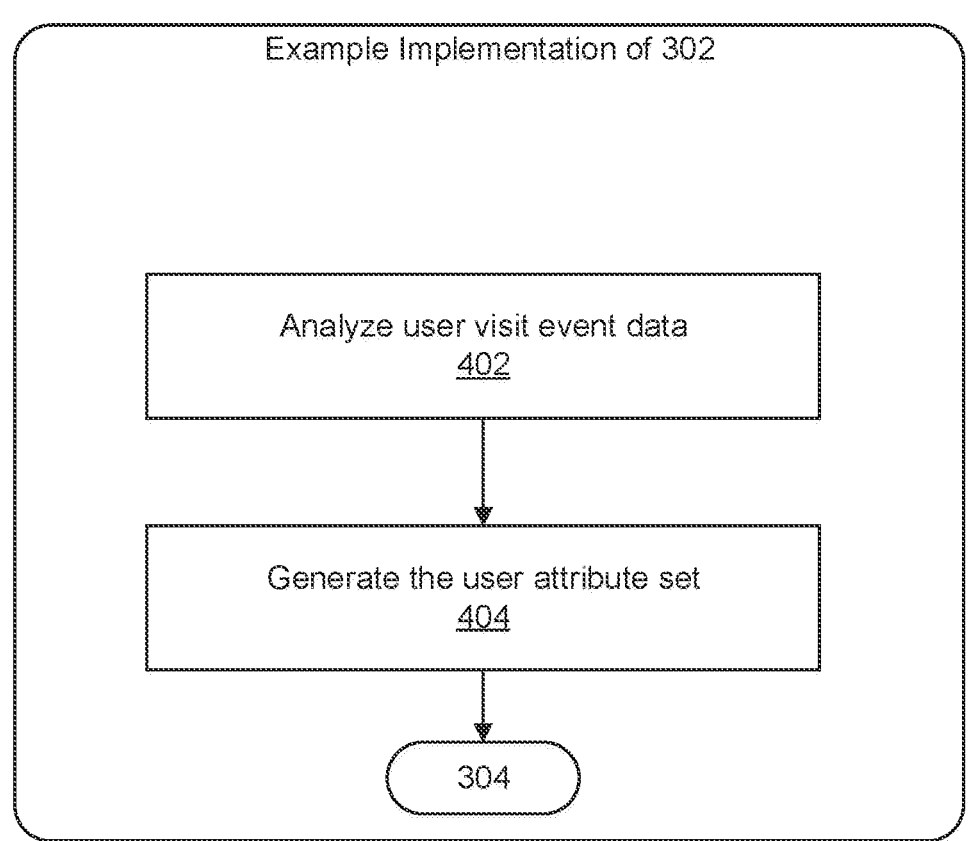
FIG. 4

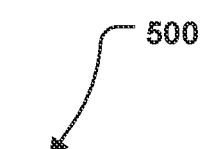
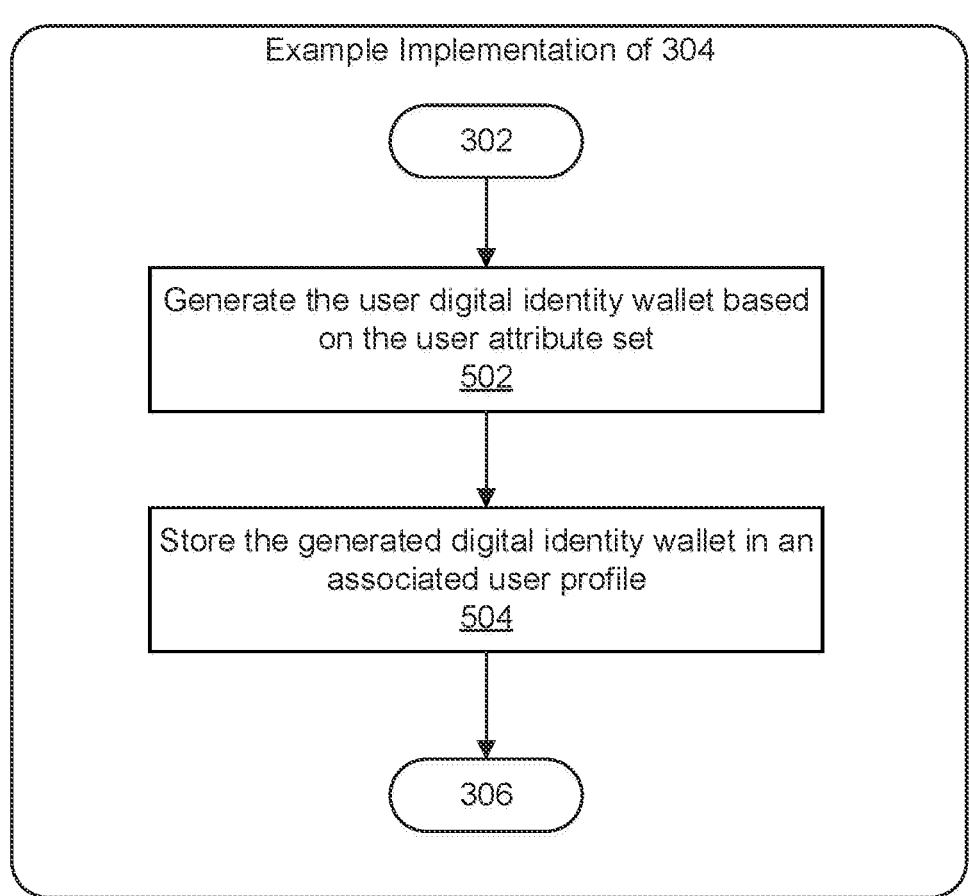
FIG. 5

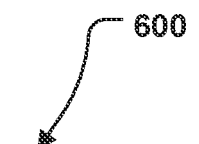
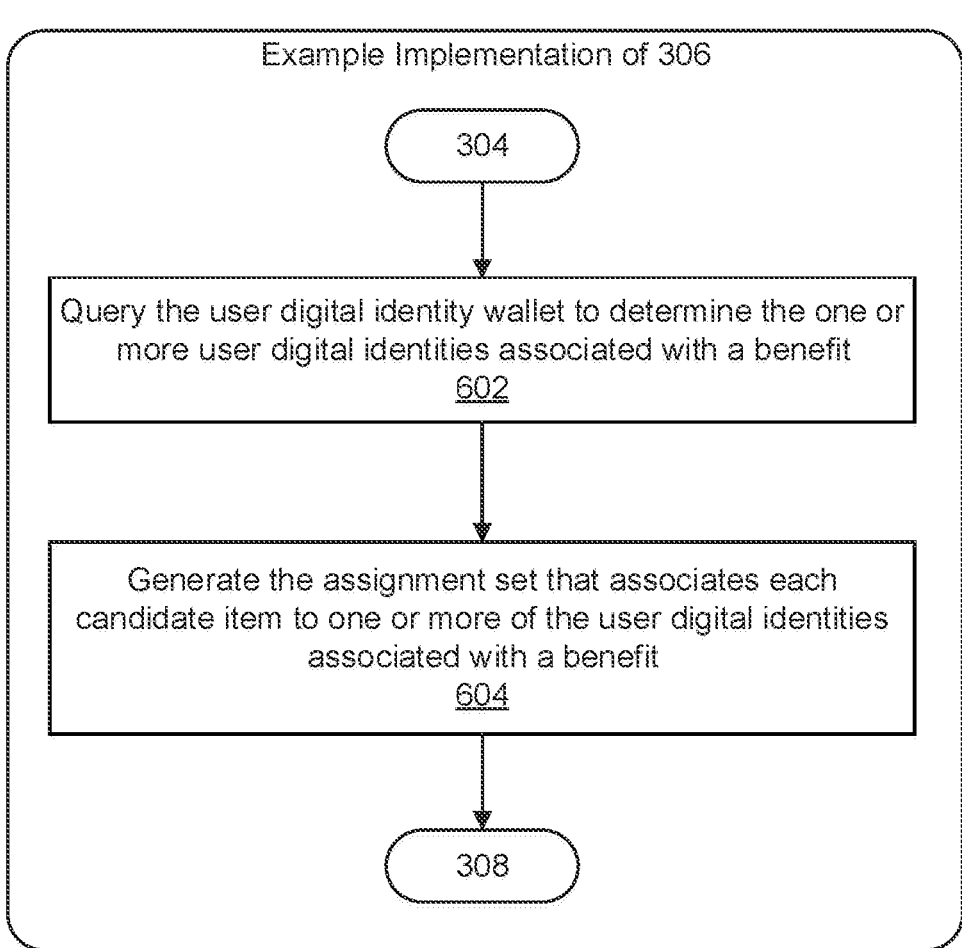
FIG. 6

700

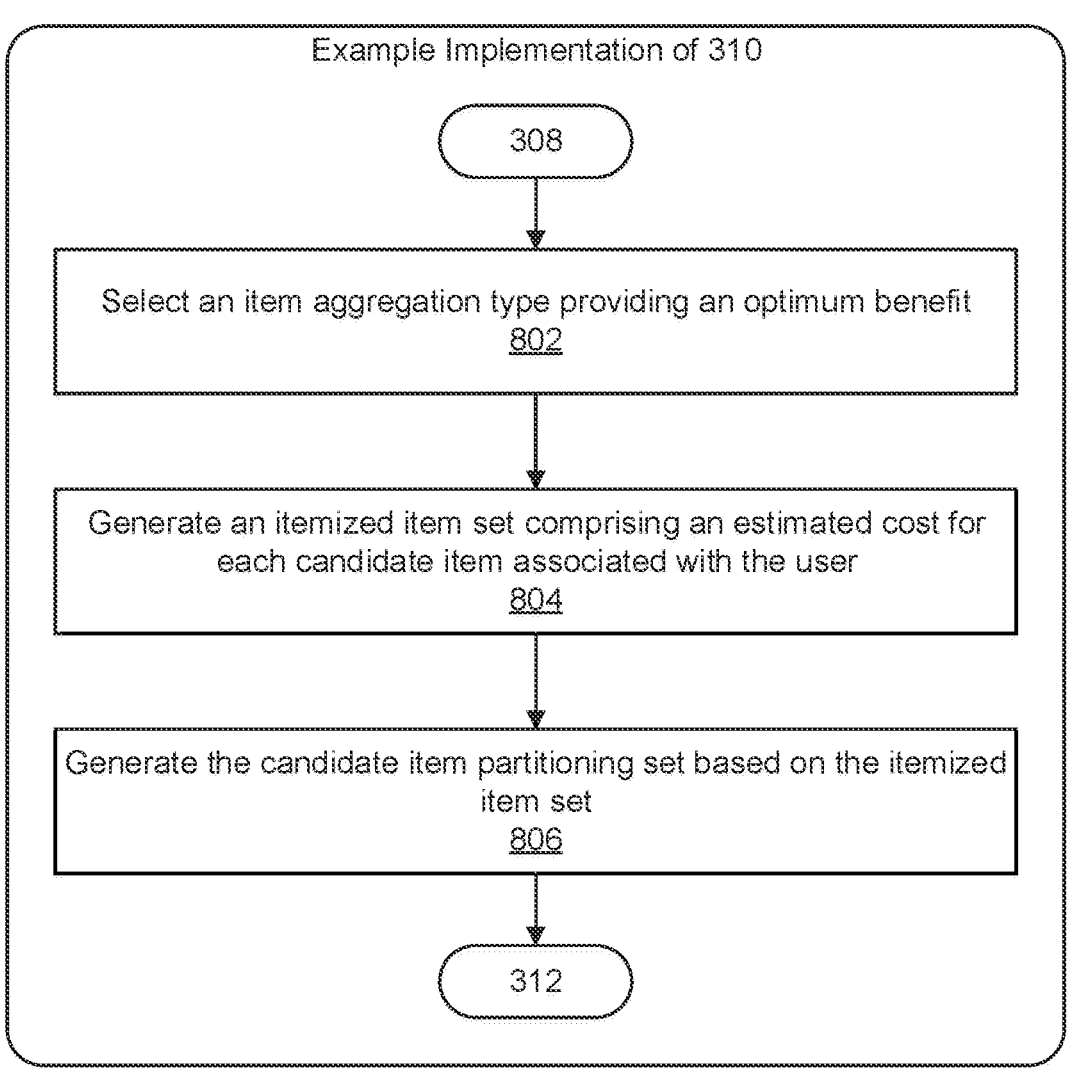
FIG. 8

950

Verification Request 952

Hi John,

We've detected candidate items in your cart, each of which have been found to be associated with one or more of your digital identities offering a particular benefit. Please view the candidate item partitioning set below for a detailed summary.

| Item(s) | Optimal User Digital Identity | Transaction Type | Price |
|---------|------------------------------|------------------|-------|
| A | 1 | Bulk | $5 |
| B | 2 | Bulk | $10 |
| C | 3 | Individual | $3 |
| D | 2 | Bulk | $12 |
| E | 2 | Bulk | $8 |
| F | 3 | Bulk | $15 |

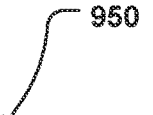

Using this candidate item partitioning set, you save $65. Would you like to proceed with the purchase?

| Yes 954 | Defer 956 | No 958 | No - Modify 960 |

SUBMIT 962

FIG. 9

ARTIFICIAL INTELLIGENCE SYSTEM FOR GRANULAR DIGITAL IDENTITY SELECTION

BACKGROUND

Cost saving applications may be used to assist users in making informed and strategic decisions when buying products or services.

BRIEF SUMMARY

The utilization of cost saving applications has been increasing among users, particularly owing to establishments integrating such technologies into their procedural frameworks to simplify operational processes and streamline client engagement. While these systems serve as conduits for users to take advantage of discounts offered by establishments, the full extent and applications of cost saving applications are still being explored.

The consumer market for cost saving systems is currently dominated by applications that serve to assist users in the discovery of deals, price comparison, and budget management. These applications rely heavily on active user engagement and predominantly cater to user preferences through manual comparison and selection, potentially leaving room for oversight, where users may fail to optimize their purchases effectively. Furthermore, these apps do not take into consideration the diverse array of digital identities associated with individual users, which could yield superior cost saving benefits compared to the limited information provided by a user. As such, there is a unique need for an autonomous technical solution that mitigates the need for user-provided information for purchase optimization. Such a system-driven solution can (i) dynamically determine and utilize multiple digital identities for individual purchase items, and (ii) dissect transactions into multiple components, thereby enhancing transactional efficiency and introducing granularity in the purchase process. A solution of this nature would be intractable without a systematic and computer-based implementation. Accordingly, there is a technical need for systems that can automatically provide this capability.

Example implementations described herein provide a technical solution to this technical problem. Moreover, example implementations overcome the challenges that arise from the manual comparison and selection of digital identities for cost savings, thereby preventing missed opportunities or financial losses incurred due to limited user-provided information. Example embodiments described herein use an item partitioning benefit optimization system that, in response to the detection of a user visit event at an establishment, is configured to determine a digital identity wallet of the user and any candidate purchase items associated with user. Further, example embodiments deploy a digital identity selection machine learning model to determine an optimal user digital identity for each candidate purchase item and generate a candidate item partitioning set that links each candidate purchase item to the optimal user digital identity. In effect, example embodiments consider user digital identity in aggregate to allow for a more effective and comprehensive determination of an optimal user digital identity as compared to conventional, limited methods that consider only siloed user digital identity data in isolation. This allows for automatic, efficient resource allocation to be performed for the user to create a seamless user experience.

Accordingly, the present disclosure sets forth systems, methods, and apparatuses to optimize the item partitioning benefit for the user. Generating a candidate item partitioning set wherein each candidate item is linked to an optimal user digital identity provides a user with greater confidence that their transaction is providing them with the best benefit. This may be particularly useful during periods of fluctuating prices (e.g., Black Friday and Cyber Monday). Moreover, example embodiments may inform a user of the optimal time to purchase a candidate item during periods of fluctuating prices, which is beyond the capability of manual monitoring or existing cost saving systems. Example embodiments thus provide real-world benefits over legacy manual approaches.

In one example embodiment, a method is provided for optimizing an item partitioning benefit for a user. The method includes detecting, by detection circuitry, a user visit event for the user at an establishment, wherein the user visit event is associated with a user attribute set, wherein the user attribute set comprises one or more user attributes. The method further includes determining, by a multimodal engine and based on the user attribute set, a user digital identity wallet, wherein (a) the digital identity wallet comprises one or more user digital identities, (b) each user digital identity of the one or more user digital identities is associated with a benefit set, and (c) the benefit set comprises one or more benefits associated with the user digital identity. The method further includes identifying, by a selection engine, one or more candidate items associated with the user. The method further includes determining, by the selection engine and using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item. The method further includes generating, by the selection engine and using the digital identity selection model, a candidate item partitioning set comprising each candidate item from the one or more candidate items linked to the optimal user digital identity determined for the corresponding candidate item, and outputting, by communications hardware, a verification request, wherein the verification request includes the generated candidate item partitioning set.

In another example embodiment, an apparatus is provided for optimizing an item partitioning benefit for a user. The apparatus includes detection circuitry configured to detect a user visit event for the user at an establishment, wherein the user visit event is associated with a user attribute set, wherein the user attribute set comprises one or more user attributes. The apparatus further includes a multimodal engine configured to determine, based on the user attribute set, a user digital identity wallet, wherein the user digital identity wallet comprises one or more user digital identities, (b) each user digital identity of the one or more user digital identities is associated with a benefit set, and (c) the benefit set comprises one or more benefits associated with the user digital identity. The apparatus further includes a selection engine configured to identify, one or more candidate items associated with the user. The selection engine is further configured to determine, using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item. The selection engine is further configured to generate, using the digital identity selection model, a candidate item partitioning set comprising each candidate item from the one or more candidate items linked to the optimal user digital identity determined for the corresponding candidate item. The apparatus further includes communications hardware configured to output a verification request, wherein the verification request includes the generated candidate item partitioning set list.

In another example embodiment, a computer program product is provided for optimizing an item partitioning benefit for a user. The computer program product comprising at least one non-transitory computer readable storage medium storing software instructions that, when executed, cause an apparatus to detect a user visit event for the user at an establishment, wherein the user visit event is associated with a user attribute set, wherein the user attribute set comprises one or more user attributes. The at least one non-transitory computer-readable storage medium storing the software instructions that, when executed, further cause an apparatus to determine, based on the user attribute set, a user digital identity wallet, wherein (a) the digital identity wallet comprises one or more user digital identities, (b) each user digital identity of the one or more user digital identities is associated with a benefit set, and (c) the benefit set comprises one or more benefits associated with the user digital identity. The at least one non-transitory computer-readable storage medium storing the software instructions that, when executed, further cause an apparatus to identify one or more candidate items associated with the user. The at least one non-transitory computer-readable storage medium storing the software instructions that, when executed, further cause an apparatus to determine, using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item. The at least one non-transitory computer-readable storage medium storing the software instructions that, when executed, further cause an apparatus to generate, using the digital identity selection model, a candidate item partitioning set comprising each candidate item from the one or more candidate items linked to the optimal user digital identity determined for the corresponding candidate item, and output a verification request, wherein the verification request includes the generated candidate item partitioning set.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3 illustrates an example flow chart for optimizing an item partitioning benefit for a user, in accordance with some example embodiments described herein.

FIG. 4 illustrates an example flowchart for detecting a user visit event for the user at an establishment, in accordance with some example embodiments described herein.

FIG. 5 illustrates an example flowchart for determining a user digital identity wallet based on the user attribute set, in accordance with some example embodiments described herein.

FIG. 6 illustrates another example flowchart for identifying one or more candidate items associated with the user, in accordance with some example embodiments described herein.

FIG. 8 illustrates an example flowchart for generating a candidate item partitioning set, in accordance with some example embodiments described herein.

FIG. 9 illustrates an example user interface illustrating a verification request used in some example embodiments described herein.

DETAILED DESCRIPTION

Figure 1:
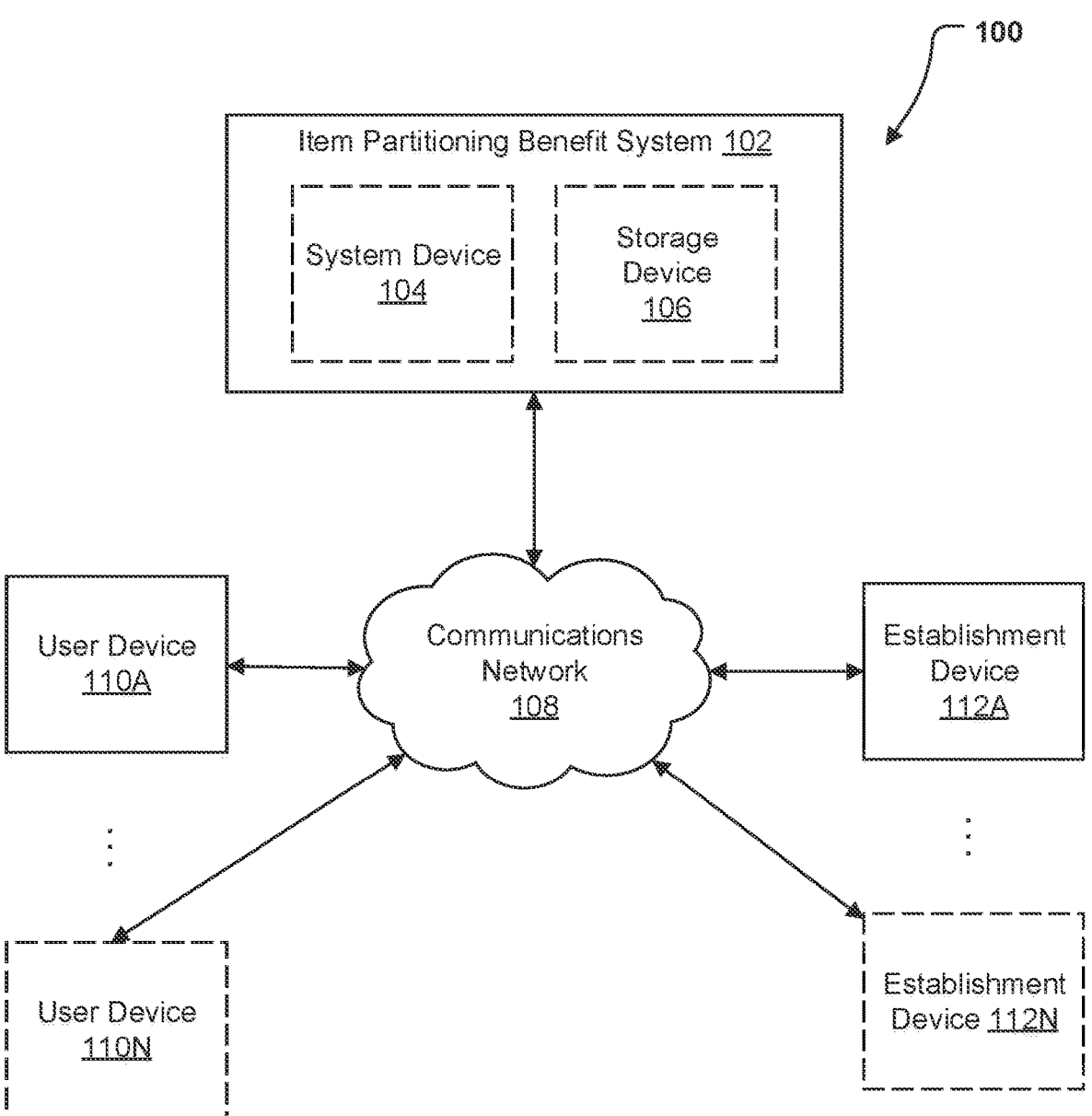
FIG. 1 illustrates a system in which some example embodiments may be used for optimizing an item partitioning benefit for a user, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "item partitioning benefit" may refer to a specific quantitative or qualitative benefit offered to a user when a larger transaction is subdivided into smaller transactions. In some embodiments, each of the smaller transactions may be associated with different digital identities, financial methods or benefits (e.g., specific deals, rewards, etc.).

The term "user" may refer to an individual or entity engaging with the item partitioning benefit optimization system 102.

The term "user visit event" refers to a data event or record that signifies an instance when a user physically or digitally visits an establishment platform.

The term "establishment" may refer to an entity that provides goods or services (e.g., business entity, organization, commercial entity). In some embodiments, the establishment may refer to the entities with which users interact and engage in transactions.

The term "user attribute set" may refer to a set of attributes associated with a user visit event. These attributes provide detailed information about the user, allowing establishments to better understand, categorize, and personalize interactions or services. In some embodiments, the user attribute set may also be used by the item partitioning benefit optimization system to identify attributes of the user visit event.

The term "user attribute" may refer to a particular attribute associated with a particular type of user visit event. In some embodiments, the user attributes may include timestamp of the user visit event, the type of establishment visited, the user's interaction patterns, and other data points relevant to the user visit event.

The term "user digital identity wallet" may refer to a digital tool or application that securely stores or manages one or more digital identities of a user. In some embodiments, the user digital identity wallet may also store authentication credentials, passwords, digital certificates, payment details, and authentication tokens.

The term "user digital identity" may refer to a stored representation of an individual's identity within a digital environment. In some embodiments, the user digital identity may encompass unique identifiers, authentication credentials, and associated personal information that allows the user to interact with digital systems, platforms, or services.

The term "benefit set" may refer to a structured or unstructured collection of advantages, privileges, or incentives linked to one or more user digital identities. In some embodiments, the benefit set may be dynamically managed and may be contingent upon user interactions, preferences, or external factors.

The term "benefit" may refer to a range of benefits associated with the user's identity, which may include personalized offers, access permissions, financial incentives, or other advantageous attributes that enhance the user experience at an establishment.

The term "candidate item" may refer to one or more tangible or intangible products, services, or digital assets that a user has demonstrated interest in acquiring or purchasing within an online or physical transactional environment. In some embodiments, the designation of a candidate item may be assigned to items that a user has added to their digital or physical shopping cart.

The term "digital identity selection model" may refer to a structured or unstructured computational framework employed within digital or physical systems to facilitate the dynamic determination and allocation of a user digital identity. In some embodiments, the digital identity selection model may encompass machine learning algorithms, rules, or methodologies that may analyze (i) contextual parameters of a user visit event, (ii) user preferences, and (iii) requirements of the item partitioning benefit optimization system to autonomously identify and assign appropriate digital identities to a candidate item.

The term "optimal user digital identity" may refer to a specific digital identity within the one or more user digital identities identified for a candidate item that is determined by the digital identity selection model as providing the most advantageous or beneficial transactional outcome.

The term "optimal item partitioning benefit" may refer to the optimal advantage or value for each of the one or more candidate items that have been determined through the subdivision of the larger transaction into smaller components.

The term "candidate item partitioning set" may refer to a structured collection of candidate items, each associated with an optimal user digital identity and the corresponding optimal item partitioning benefit. In some embodiments, the candidate item partitioning set may be structured according to the technological framework requirements of an establishment.

The term "verification request" may refer to a systematic communication outputted to the user that includes the candidate item partitioning set generated for a particular user visit event, wherein the candidate item partitioning set includes the associated optimal user digital identity and corresponding optimal benefit for each of the one or more candidate items. In some embodiments, the user may be prompted to confirm the selections in the generated candidate item partitioning set and continue to checkout. In some embodiments, wherein the user denies the selections in the generated candidate item partitioning set, the item partitioning benefit optimization system may prompt the user to save the selections in the generated candidate item partitioning set for a potential future purchase.

The term "set of data environments" may refer to a structured or unstructured collection of distinct digital contexts or repositories within which user-related information, particular user digital identities may be stored. In some embodiments, the set of data environments may encompass various sources such as online platforms, applications, databases, or interconnected systems, each containing relevant data pertaining to a user digital identity.

The term "user profile" may refer to a digital representation of a user within a technological framework that may be linked to the digital identity wallet of the user.

The term "assignment set" may refer to a set that establishes an association between a candidate item and one or more user digital identities that are offering a benefit for the particular candidate item. In some embodiments, the assignment set may serve as a mapping or configuration wherein each candidate item is distinctly correlated with the specific user digital identities associated with the benefits applicable to the particular candidate item.

The term "benefit score" may refer to a quantitative or qualitative metric that serves as an evaluative measure determining the degree of benefit that a user digital identity provides for a candidate item. In some embodiments, the benefit score may be determined based on comprehensive analyses, considering factors such as the benefits associated with each of the one or more user digital identities.

The term "item aggregation type" may refer to a classification that distinguishes between a bulk transaction, wherein multiple candidate items are aggregated into a single transaction, and an individual transaction, wherein each candidate item undergoes a separate transaction. In some embodiments, the determination of the item aggregation type discerns whether the optimum benefit is determined through the consolidation of multiple candidate items into a bulk transaction or through the individual processing of each candidate item.

The term "itemized item set" may refer to a set that includes cost related information about a candidate item. In some embodiments, the itemized item set serves to provide a comprehensive breakdown of costs and discounts attributed to the one or more candidate items, in relation to the selected item aggregation type for each of the one or more candidate items.

The term "verification response" may refer to a communication response from the user in response to the presentation of the generated candidate item partitioning set. In some embodiments, the verification response includes distinct statuses: (i) a confirmation status indicative of user approval of the generated candidate item partitioning set, (ii) a denial status indicative of user disapproval of the generated candidate item partitioning set, and (iii) a pending status indicative of user deferral or postponement of a transactional decision regarding the generated candidate item partitioning set.

System Architecture

Example embodiments described herein may be implemented using any of a variety of computing devices or servers. To this end, FIG. 1 illustrates an example environment 100 within which various embodiments may operate. As illustrated, an item partitioning benefit optimization system 102 may include a system device 104 in communication with a storage device 106. Although system device 104 and storage device 106 are described in singular form, some embodiments may utilize more than one system device 104, more than one storage device 106, and/or the like. Some embodiments of the item partitioning benefit optimization system 102 may not require a system device 104 and/or storage device 106 at all. Whatever the implementation, the item partitioning benefit optimization system 102 may receive and/or transmit information via communications network 108 (e.g., the Internet) with any number of other devices, such as one or more of user devices 110A-110N and/or establishment devices 112A-112N. A user device 110A-110N may include smartphones, laptops, tablets, and/or the like, whereas an establishment device 112A-112N may be a device associated with an establishment that stores data for the establishment.

In some embodiments, the item partitioning benefit optimization system 102 may be implemented as one or more computing devices or servers, which may be composed of a series of components. These components of system device 104 may be physically proximate to the other components of the item partitioning benefit optimization system 102, while other components may not be. The system device 104 may receive, process, generate, and transmit data, signals, and electronic information to facilitate the operations of the item partitioning benefit optimization system 102. Particular components of the item partitioning benefit optimization system 102 are described in greater detail below with reference to apparatus 200 in connection with FIG. 2.

In some embodiments, the item partitioning benefit optimization system 102 further includes a storage device 106 that comprises a distinct component from other components of the item partitioning benefit optimization system 102. Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the item partitioning benefit optimization system 102. Storage device 106 may store information relied upon during operation of the item partitioning benefit optimization system 102, such as various user attribute sets that may be used by the item partitioning benefit optimization system 102, data and documents to be analyzed using the item partitioning benefit optimization system 102, or the like. In addition, storage device 106 may store control signals, device characteristics, and access credentials enabling interaction between the item partitioning benefit optimization system 102 and one or more of the user device 110A-110N or establishment device 112A-112N.

The one or more user devices 110A-110N and the one or more establishment devices 112A-112N may be embodied by any computing devices known in the art. The one or more user devices 110A-110N and the one or more establishment devices 112A-112N need not themselves be independent devices, but may be peripheral devices communicatively coupled to other computing devices.

Although FIG. 1 illustrates an environment and implementation in which the item partitioning benefit optimization system 102 interacts indirectly with a user via one or more of user device 110A-110N and/or establishment device 112A-112N, in some embodiments users may directly interact with the item partitioning benefit optimization system 102 (e.g., via communications hardware of the item partitioning benefit optimization system 102), in which case a separate user device 110A-110N and/or establishment device 112A-112N may not be utilized. Whether by way of direct interaction or indirect interaction via another device, a user may communicate with, operate, control, modify, or otherwise interact with the item partitioning benefit optimization system 102 to perform the various functions and achieve the various benefits described herein.

Example Implementing Apparatuses

Figure 2:
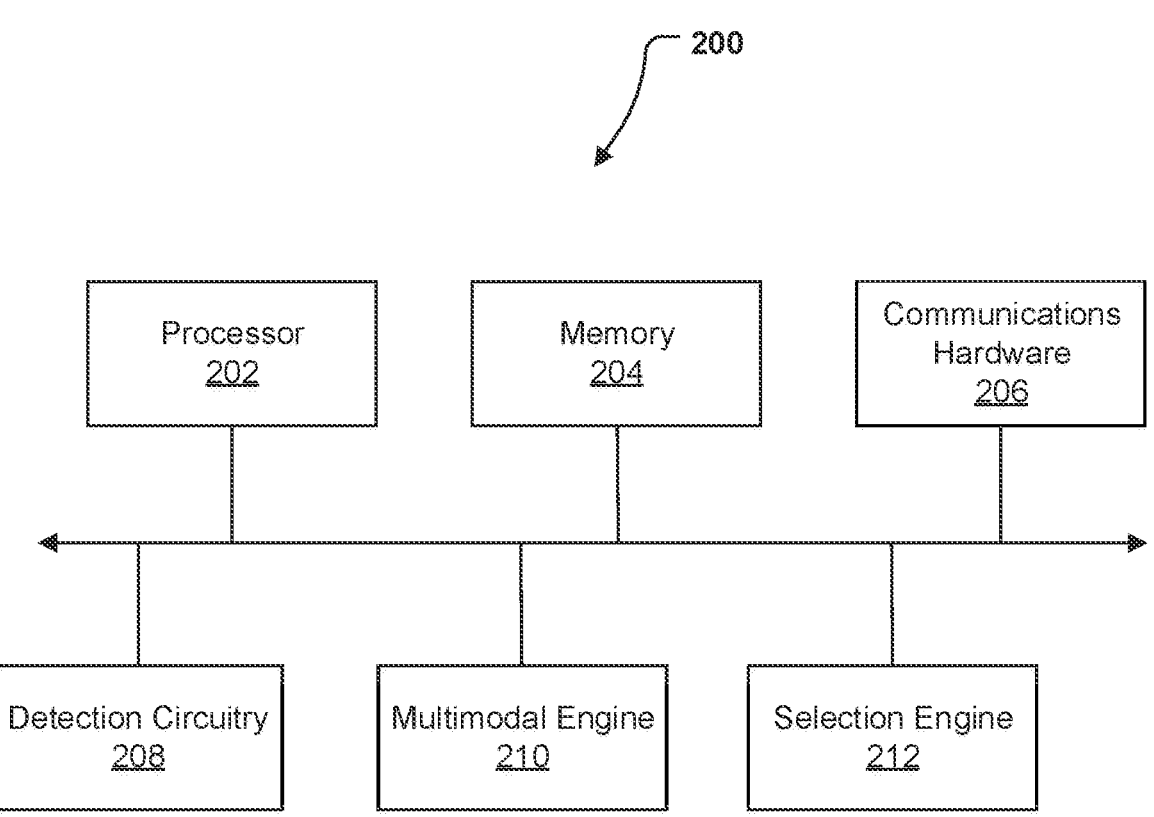
FIG. 2 illustrates a schematic block diagram of example circuitry embodying a device that may perform various operations in accordance with some example embodiments described herein.

The item partitioning benefit optimization system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-9. As illustrated in FIG. 2, the apparatus 200 may include processor 202, memory 204, communications hardware 206, detection circuitry 208, multimodal engine 210, and selection engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, and multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a detection circuitry 208 that detects a user visit event for a user at an establishment. The detection circuitry 208 may utilize processor 202, memory 204, or any other hardware component included in the apparatus 200 to perform these operations, as described in connection with FIGS. 3-6 below. The detection circuitry 208 may further utilize communications hardware 206 to gather data from a variety of sources (e.g., user device 110A through user device 110N or storage device 106, as shown in FIG. 1), and/or exchange data with a user.

Further, the apparatus 200 further comprises a multimodal engine 210 that extracts the one or more user digital identities of the user from a set of data environments, generates the user digital identity wallet, and stores the generated digital identity wallet in an associated user profile. The multimodal engine 210 may utilize processor 202, memory 204, or any other hardware component included in the apparatus 200 to perform these operations, as described in connection with FIGS. 3 and 5 below. The multimodal engine 210 may further utilize communications hardware 206 to gather data from a variety of sources (e.g., user device 110A-110N, storage device 106, or as shown in FIG. 1), and/or exchange data with a user to extract user visit event data.

In addition, the apparatus 200 further comprises a selection engine 212 that identifies a user digital identity wallet based on the user attribute set, determines an optimal user digital identity from the one or more user digital identities for each candidate item of the one or more candidate items, and generates a candidate item partitioning set. The selection engine 212 may utilize processor 202, memory 204, or any other hardware component included in the apparatus 200 to perform these operations, as described in connection with FIGS. 3, 6-8 below. The selection engine 212 may further utilize communications hardware 206 to gather data from a variety of sources (e.g., user device 110A-110N or establishment device 112A-112N, as shown in FIG. 1), and/or exchange data with a user, and may utilize processor 202, memory 204, or any other hardware component included in the apparatus 200 to query the user digital identity wallet to determine one or more user digital identities, generate an assignment set, identify whether a candidate item is associated with a singular digital identity or a plurality of user digital identities, calculate a benefit score for each user digital identity associated with the candidate item, determine the optimal user digital identity based on the calculated benefit score, select an item aggregation type providing an optimum benefit, generate an itemized item set, generate the candidate item partitioning set, analyze one or more historical user attributes, and train the digital identity selection model using the historical digital identity selection data.

Although components 202-212 are described in part using functional language, it will be understood that the particular implementations necessarily include the use of particular hardware. It should also be understood that certain of these components 202-212 may include similar or common hardware. For example, the detection circuitry 208, multimodal engine 210, and selection engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the detection circuitry 208, multimodal engine 210, and selection engine 212 may leverage processor 202, memory 204, or communications hardware 206 as described above, it will be understood that any of detection circuitry 208, multimodal engine 210, and selection engine 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that detection circuitry 208, multimodal engine 210, and selection engine 212 comprise particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts, schematic block diagrams, and graphical user interfaces.

Example Operations

Turning to FIGS. 3-9, example flowcharts, schematic block diagrams, and graphical user interfaces are illustrated that contain example operations implemented by example embodiments described herein. The operations illustrated in FIGS. 3-9 may, for example, be performed by system device 104 of the item partitioning benefit optimization system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, detection circuitry 208, multimodal engine 210, selection engine 212, and/or any combination thereof. It will be understood that user interaction with the item partitioning benefit optimization system 102 may occur directly via communications hardware 206, or may instead be facilitated by a separate user device 110A-110N, as shown in FIG. 1, and which may have similar or equivalent physical componentry facilitating such user interaction.

Turning first to FIG. 3, a procedure 300 illustrates example operations for optimizing an item partitioning benefit for a user. By determining an optimal digital identity for a candidate item, the item partitioning benefit optimization system 102 ensures that the user receives optimal rewards or benefits for a specific transaction. For example, a user visits a superstore-based establishment and demonstrates an interest in purchasing 2 cartons of milk and 2 sustainably-manufactured clothing items. In this scenario, the item partitioning benefit optimization system 102 may identify that the user has digital identities associated with Bank X, Bank Y, and Organization Z. The item partitioning benefit optimization system 102 may then analyze these user digital identities to determine the digital identities offering benefits applicable to the chosen candidate items. For instance, if the digital identity associated with Bank X offers a 20% discount on food items and Organization Z offers a 5% cashback on sustainable clothing purchases, the item partitioning benefit optimization system 102 may determine the cost savings with each digital identity and select the digital identity providing the optimal benefit. Following this analysis, the item partitioning benefit optimization system may output a verification request to the user that includes a personalized recommendation as follows: "use the Bank X digital identity for purchasing the food items and the Organization Z digital identity for purchasing the clothing items, as these selections provide the optimal benefit".

As shown by operation 302, the apparatus 200 includes means, such as processor 202, memory 204, communications hardware 206, detection circuitry 208, or the like for detecting a user visit event for the user at an establishment. In some embodiments, the detection circuitry 208 may use tools such as IP address tracking, browser cookies and session data, device fingerprinting, and login and authentication records to track user presence within a digital environment of an establishment (e.g., website). The detection circuitry 208 may function in response to a detection algorithm initialized by the processor 202. The processor 202 may also allocate computational resources and activate the necessary system components for user data acquisition, may manage the real-time processing of incoming data and may execute pattern recognition algorithms to (i) identify signals indicative of a user visit event, (ii) assess the validity of the detected signals, (iii) filter noise, (iv) and trigger subsequent system-wide actions based on predefined criteria.

In some embodiments, an establishment database may be maintained in an associated memory, such as memory 204, and may include one or more establishment profiles. Each establishment profile may uniquely correspond to a particular establishment and may include a repository comprising one or more of the products or services offered by the establishment. In some embodiments, communications hardware 206 may receive a notification of a new deal on one or more of the products or services offered by the establishment, and may update the establishment profile of the corresponding establishment to include this new deal. Alternatively, detection circuitry 208 may use tools, such as web-crawlers, optical character recognition techniques, natural language processing techniques and/or the like to identify the one or more products or services offered by an establishment, and accordingly update the establishment profile.

In order to detect a user visit event, the detection circuitry 208 may analyze a range of data to identify the establishment and determine the purpose of the user visit event. The detection circuitry 208 may classify the user visit event as physical or digital based on the data source and context, and may also sub-categorize the users by identifying new users versus returning users. In instances wherein the user visit event involves a physical user presence, the detection circuitry 208 may use communications hardware 206 (e.g., Wi-Fi, Bluetooth beacons, RFID tags), to track user devices 110A-110N within the establishment's range of location. The detection circuitry 208 may also analyze signal strength and user device proximity to determine physical presence. Alternatively, the user visit event may be digital, wherein the detection circuitry 208 may process HTTP logs, or employ web analytics and tracking tools for user visit event detection. In some embodiments, memory 204 may store user visit event data, such as device IDs, timestamps of a user visit, session URL details of URLs, and/or the like. The detection circuitry 208 may also be configured to respond to establishment requirements and trigger notifications or actions based on the user visit event (e.g., notifying staff of a physical user visit event or customizing content for a digital user visit event). In some embodiments, as described below, operation 302 may be performed in accordance with the operations described by FIG. 4.

Turning now to FIG. 4, a procedure 400 illustrates example operations for detecting a user visit event for the user at an establishment. As shown by operation 402, the apparatus 200 includes means such as processor 202, memory 204, communications hardware 206, or the like, for analyzing user visit event data. Upon detection of the user visit event, the communications hardware 206 may access a memory, such as memory 204, to deploy a user visit event data extraction algorithm that is configured to extract user visit event data from a data environment. In some embodiments, the user data extraction algorithm may comprise a set of instructions that specify how to access, retrieve, and/or store user visit event data (e.g., user digital identities, page views, click-through rate, user visit event duration, conversion rate, interaction events, search queries, device information, unique user identifiers, geographic location data, transaction history, custom filters, etc.), and/or the like. In example embodiments, the user visit event data extraction algorithm may include parameters such as (i) data source locations (e.g., relational databases such as MySQL, cloud storage such as Google Cloud, API endpoints, file systems, social media platforms, etc.), (ii) data format specifications (e.g., JavaScript object notation (JSON), extensible markup language (XML), comma-separated values (CSV), database schema, etc.), (iii) extraction criteria, and/or the like.

The user visit event data may be collected and/or received from various devices, such as any one of user devices 110A-110N or establishment devices 112A-112N. In an instance in which a user re-visits an establishment, the historical user visit event data may also be retrieved from memory 204 for further analysis and use during the current user visit event. In example embodiments, a digital identity selection model may also be used to determine the parameters relevant for extracting specific user visit event data.

Via communications hardware 206, the detection circuitry 208 may establish connections to the designated data sources (e.g., any one of the user devices 110A-110N and/or establishment devices 112A-112N) and authenticate itself to gain access to the data environment, ensuring compliance with security protocol and permissions. The detection circuitry 208 may query the data environment based on the user visit event data extraction criteria defined by the user visit event data extraction algorithm and employ processor 202 to process the extracted user visit event data in real-time. Data processing by the processor 202 may involve cleaning, transforming, and/or organizing the data for storage in memory 204. Upon completion of the extraction operation, the detection circuitry 208 may provide the extracted user visit event data to the communications hardware 206 for further processing or analysis.

In some embodiments, the detection circuitry 208 may use any suitable techniques such as NPL, OCR, or may further, use a pre-processing model, such as a neural network (e.g., a convolutional neural network) to identify relevant user attributes from the user visit event data. As will be appreciated, the user visit event data may include a variety of formats such that the user visit event data may be unstructured. Thus, the pre-processing model may be configured to apply extraction techniques to unstructured user visit event data to extract useful, structured, user attributes.

In some embodiments, the detection circuitry 208 may extract user visit event data that includes a user attribute set comprising one or more user attributes. In some embodiments, the user attribute set may include a user attribute to determine the user visit event type, wherein the user visit event type may classify the user visit event as being a physical or online visit. In some embodiments, the user event type may further comprise user event type attributes including data points related to user engagement metrics, user behavior analytics, user access, or device information. For example, if an online user visit event is detected, the user engagement metric data points may comprise (i) page views, (ii) session duration, (iii) click-through rate, (iv) conversion rate, (v) bounce rate, (vi) social media engagement, and/or the like. User behavior analytics data points may comprise (i) navigation patterns of how users move through a website, (ii) search queries, (iii) click heat maps (e.g., visual representation of where a user clicks most frequently on a webpage), (iv) form analytics (e.g., examination of user interactions with forms including completion rates and the identification of fields causing abandonment), (v) event tracking (e.g., button clicks, video views, downloads), and/or the like. Data points related to user access may comprise (i) login and authentication records including information about devices used and login frequencies, (ii) geographical data of users (e.g., country, city, region), (iii) user digital identities and permissions, (iv) IP address, and/or the like. Data points related to device information may comprise (i) type of device used by the user (e.g., desktop, laptop, tablet, smartphone), (ii) operating system of the device (e.g., Windows, macOS, IOS, Android), (iii) browser type and version, (v) device ID (e.g., a unique identifier associated with the user device), and/or the like.

As shown by operation 404, the apparatus 200 includes means such as processor 202, memory 204, communications hardware 206, detection circuitry 208, or the like, for generating the user attribute set. In some embodiments, the detection circuitry 208 may receive the user visit event data from communications hardware 206 and analyze the user visit event data to generate the user attribute set. In some embodiments, only a subset of the user attributes may be included in the user attribute set. The subset of user attributes included in the user attribute set may be determined based on historical analyses performed by the detection circuitry 208 for the same user. For example, a user named Alex frequently engages with an e-commerce website. The detection circuitry 208 may analyze Alex's historical interactions with the platform and identify recurring patterns and significant actions that characterize Alex's typical user visit event. If the historical analyses reveal that Alex consistently performs actions such as "product search", "item views", "adding products to the shopping cart", and "completing purchases", these actions may be recognized by the detection circuitry 208 as being pivotal events in Alex's typical user visit event. As a result, the subset of user attributes included in Alex's user attribute set may be tailored to comprise these historical actions.

Returning to FIG. 3, as shown by operation 304, the apparatus 200 includes means such as processor 202, memory 204, communications hardware 206, multimodal engine 210, or the like, for determining a user digital identity wallet based on the user attribute set. In some embodiments, the multimodal engine 210 may analyze the user attribute set by categorizing the user attribute set into different modalities, distinguishing between textual, numerical, and visual components. This segmentation may be essential for handling each data type appropriately during subsequent processing stages. In some embodiments, the multimodal engine 210 may perform NLP tasks such as sentiment analysis, keyword extraction, and topic modeling for textual elements, statistical analysis and feature extraction for numerical attributes, and computer vision techniques such as image recognition, object detection, or sentiment analysis for visual elements. In some embodiments, the integrated data from different modalities may be subject to pattern recognition algorithms deployed by a machine learning model. During this process, the multimodal engine 210 may use data minimization techniques to only retain information essential for digital identity extraction.

In some embodiments, operation 304 may be performed in accordance with the operations described by FIG. 5. Turning now to FIG. 5, a procedure 500 illustrates example operations for determining a user digital identity wallet based on the user attribute set. As shown by operation 502, the apparatus 200 includes means such as processor 202, memory 204, communications hardware 206, multimodal engine 210, or the like, for generating the user digital identity wallet based on the user attribute set. Following the data minimization process, as described above, the multimodal engine 210 may extract one or more user digital identities from the retained information without disclosing personally identifiable information and ensuring anonymity and compliance with relevant data protection laws. In some embodiments, the one or more digital identities may be extracted from data environments such as (i) online platforms (e.g., social media, e-commerce websites, and/or online forums), (ii) mobile applications, (iii) website interactions, (iv) search engines, (v) email platforms, (vi) financial transaction history, (viii) educational platforms, (ix) surveillance systems, and/or the like.

The multimodal engine 210 may retrieve from memory 204, the extracted user digital identities and deploy a preprocessing function to ensure consistency and compatibility of the extracted user digital identities with the digital identity selection model. Furthermore, the preprocessing function may determine a digital identity type for the one or more user digital identities. For example, in some embodiments, a digital identity type for digital identity X may be classified as "a financial digital identity for sports and entertainment" related transactions, whereas a digital identity type for digital identity Y may be classified as "a financial digital identity for grocery" related transactions. Similarly, in some embodiments, digital identity A may be classified as a health digital identity for emergency hospital visits, whereas digital identity B may be classified as a health digital identity B for specialist visits. In some embodiments, only a subset of the one or more extracted user digital identities may be included as user digital identities in the user digital identity wallet. For example, the multimodal engine 210 may only include user digital identities that correspond to a particular digital identity type. As such, in some embodiments, the multimodal engine 210 may generate the user digital identity wallet upon determination of a digital identity type for each of the one or more user digital identities.

As shown by operation 504, the apparatus 200 includes means such as processor 202, memory 204, communications hardware 206, multimodal engine 210, or the like, for storing the generated digital identity wallet in an associated user profile. In some embodiments, the generated digital identity wallet may be re-structured into a suitable format for storage (e.g., JSON, XML, Protobuf, CBOR, SQL or NoSQL databases, encrypted storage formats, custom binary formats, blockchain or distributed ledger technology, HSM protected storage, cloud-based storage services, etc.). In some embodiments, the processor 202 may allocate memory space to store the structured user digital identity wallet which may serve as a repository for the user's digital identity wallet with the overall user profile. In some embodiments, the processor 202, in collaboration with the communications hardware 206, may also apply encryption techniques to secure the user digital identity wallet to ensure protection of personal identifying information. In some embodiments, the communications hardware 206 may also facilitate interactions with an internal or external establishment database where user profiles may be stored. In some embodiments, the processor 202 may coordinate the storing of the generated digital identity wallet into the associated user profile. As the user engages in new user visit events, the processor 202 may update the stored user profile and associated digital identity wallet and use the updated information for continuous training of the digital identity selection model. In some embodiments, the processor 202, in conjunction with the communications hardware 206, may also incorporate a user consent mechanism during the storage and updating processes to ensure that the user maintains explicit control over how their digital identity wallet is stored within the user profile.

Returning to FIG. 3, as shown by operation 306, the apparatus 200 includes means such as processor 202, memory 204, communications hardware 206, selection engine 212, or the like, for identifying one or more candidate items associated with the user. In some embodiments, processor 202 may be equipped with suitable monitoring algorithms (e.g., JavaScript snippets or Software Development Kits) that may continuously track and capture the one or more candidate items a user adds to their digital shopping cart. In some embodiments, the act of adding a candidate item to a digital or physical shopping cart may be considered as the user demonstrating interest for purchasing the candidate item. Once a user adds an item to their shopping cart, this event may be communicated in real-time via communications hardware 206 to the servers of the corresponding establishment. In some embodiments, the selection engine 212 may use the processor 202 to process data pertaining to the identified candidate items, and perform data segmentation for further analysis regarding shopping cart activities (e.g., time intervals between candidate item selections). In some embodiments, the establishment servers may establish user authentication mechanisms to ensure that the item partitioning benefit optimization system 102 associates the shopping cart activities with the correct user. In scenarios wherein the user visit event is a physical visit, the communications hardware 206 (e.g., Internet of Things devices, RFID technology) may also identify the candidate items associated with the user using wireless communication protocols such as MQTT for real-time updates. In some embodiments, all tangible or intangible items in the estab- lishment, along with the physical shopping cart may be equipped with RFID tags. When a user places an item in the physical shopping cart, the RFID readers may automatically scan the RFID tags on each item and relay real-time infor- mation about the candidate items added to the shopping cart to the establishment servers via communications hardware 206. Similar to the digital shopping scenario described above, the processor 202 may perform data segmentation on the received information about the candidate items for further analysis. In some embodiments, the selection engine 212, in conjunction with the processor 202 may also employ pattern recognition algorithms to identify user preferences and behaviors associated with each of the one or more candidate items.

In some embodiments, operation 306 may be performed in accordance with the operations described by FIG. 6. Turning now to FIG. 6, a procedure 600 illustrates example operations for identifying one or more candidate items associated with the user. As shown by operation 602, the apparatus 200 includes means such as processor 202, memory 204, communications hardware 206, selection engine 212, or the like, for querying the user digital identity wallet to determine the one or more user digital identities associated with a benefit. In some embodiments, the pro- cessor 202 may initiate the retrieval of the one or more user digital identities from the user digital identity wallet stored in a user profile in memory 204. In some embodiments, the user profile may be linked to a unique identifier such as a user ID (e.g., User123). Communications hardware 206 may facilitate secure and real-time communication with the user digital identity wallet using encrypted communication pro- tocols, such as HTTPS, to ensure data security during the interaction. In some embodiments, the selection engine 212 may analyze the user digital identity wallet to identify the one or more user digital identities associated with a benefit for each candidate item in the user shopping cart. The selection engine 212 may analyze the wallet for digital identities tagged with benefits such as discounts, loyalty points, or exclusive access. In some embodiments, the benefit-associated digital identity determination may involve rule-based filtering wherein predefined rules or conditions may be applied to the digital identity wallet data to identify only those digital identities that are associated with benefits applicable to the candidate items. In some embodiments, these predefined rules or conditions may be based on benefit types, validity periods, or user engagement thresholds. Subsequently, the selection engine 212 may use algorithms to scan each user digital identity within the digital identity wallet and filter one or more user digital identities to include only those with tags or attributes indicative of a benefit associated with a candidate item. For example, if the user has visited a grocery store, the item partitioning benefit optimization system 102 may employ a predefined rule wherein the selection engine 212 may only identify user digital identities tagged with the "grocery discount". In some embodiments, the selection engine 212 may also incorporate a dynamic adjustment module that uses a machine learning model to consider factors such as recent user visit events, transaction history, and contextual infor- mation to refine benefit and candidate item associations in real-time. For example, the selection engine 212 may increase discount percentages for product categories the user frequently purchases, and the dynamic adjustment module, based on machine learning insights, may dynamically modify the benefit and candidate item associations to iden- tify the digital identities providing more attractive discounts on products the user has demonstrated consistent interest in.

As shown by operation 604, the apparatus 200 includes means such as processor 202, memory 204, communications hardware 206, selection engine 212, or the like, for gener- ating the assignment set that associated each candidate item to one or more of the one or more user digital identities associated with a benefit. In some embodiments, the pro- cessor 202 initiates the operation by accessing the identified user digital identities stored in memory 204. In some embodiments, generation of the assignment set may involve the processor 202 systematically mapping each candidate item to the one or more user digital identities identified by the selection engine 212 in operation 602. Further, in some embodiments, the assignment set may be structured in a format (e.g., JSON, XML, CSV) that facilitates seamless data retrieval and processing to optimize computational efficiency. The memory 204 may serve as a repository to store the generated assignment set, whereas the communi- cations hardware 206 may facilitate real-time communica- tion between the processor 202 and memory 204 to ensure that the assignment set is accurately updated and retrieved during transactional interactions. In some embodiments, the processor 202 may deploy a preprocessing function to ensure consistency and compatibility of the generated assignment set with a digital identity selection mode. In some embodiments, the generated assignment set may also be stored in memory 204 for future retrieval.

Returning to FIG. 3, as shown by operation 308, the apparatus 200 includes means such as processor 202, memory 204, communications hardware 206, selection engine 212, or the like, for determining an optimal user digital identity from the one or more user digital identities for each candidate item of the one or more candidate items. The selection engine 212 may operate in conjunction with a digital identity selection model. In some embodiments, the digital identity selection model may be trained upon a historical user attribute set stored in memory 204, wherein the historical user attribute set is associated with a historical user and comprises one or more historical user attributes. A historical user attribute set may refer to a set of historical attributes associated with a historical user visit event, such as historical user interaction patterns, type of establishment visited, historical transaction history, etc. In some embodi- ments, the historical user attribute set may also include historical candidate item-digital identity benefit associations that may be used in the future to identify an optimal user digital identity for a candidate item during an ongoing user visit event. In example embodiments, training of the digital identity selection model may occur as follows: (i) data preprocessing wherein the selection engine 212 cleans and preprocesses the historical user attributes from the historical user attribute set to handle any missing values, outliers, or data quality issues, (ii) feature engineering wherein the selection engine 212 may create or extract features from the historical user attribute set that may be relevant for deter- mining an optimal user digital identity, (iii) splitting the data wherein the selection engine 212 may divide the engineered dataset into a training set and testing set, (iv) selecting an appropriate machine learning classification algorithm (e.g., logistic regression, decision trees, random forests, support vector machines, or neural networks), (v) training the digital identity selection model using the training data, (vi) evalu- ating the model's performance using the testing dataset, (vii)

fine-tuning the model's hyperparameters such as learning rate, regularization strength or tree depth, depending on the chosen algorithm to optimize its performance, (viii) performing k-fold cross-validation on the training data to assess the model's generalization performance to ensure that the model does not over fit the training data, and (ix) analyzing and subsequently identifying the different features of user digital identities that optimize the partitioning benefit for a candidate item.

In example embodiments, the selection engine 212 may enable the digital identity selection model to perform feature engineering by accessing memory 204 to retrieve additional information from the user digital identity wallet, if there are missing values for the one or more digital identities identified a particular candidate item. Further example embodiments may also involve the digital identity selection model performing a normalization function (e.g., min-max scaling, z-score standardization, etc.) to ensure that the one or more identified user digital identities for each candidate item are being compared on a consistent scale.

Figure 7A:
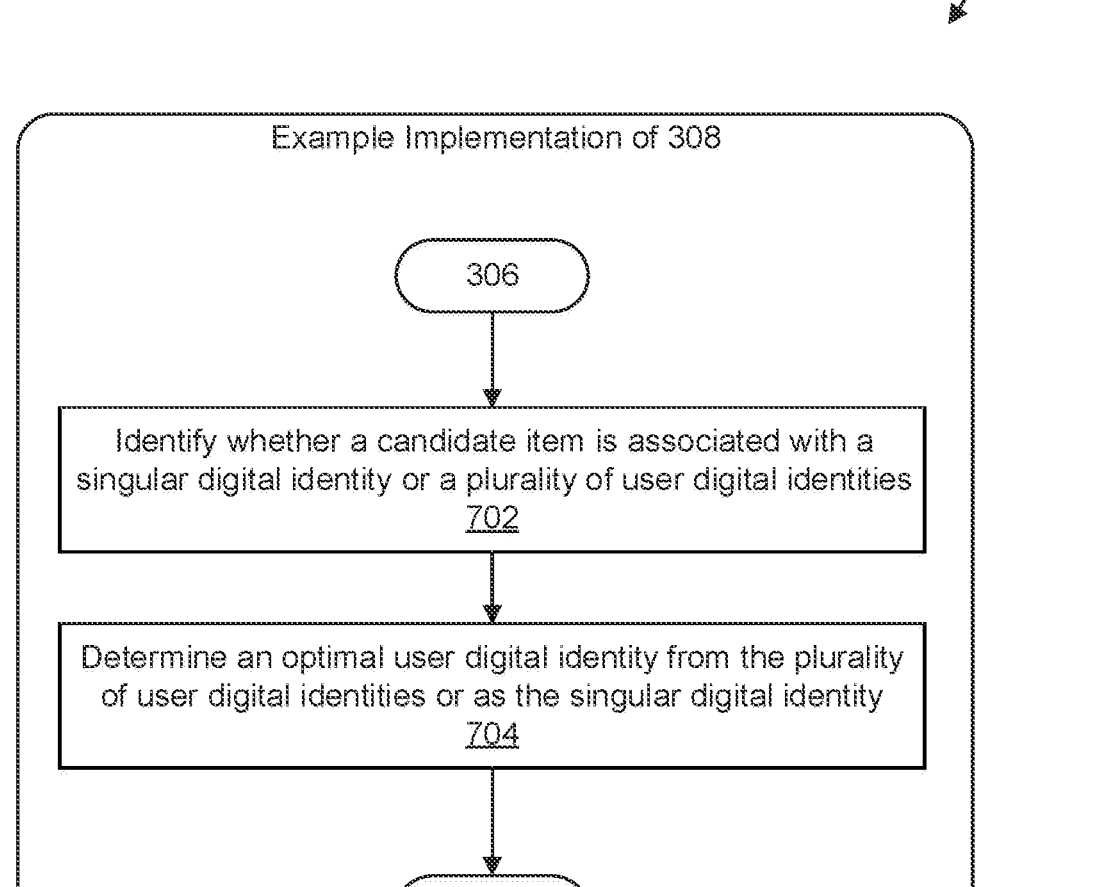
FIG. 7A illustrates an example flowchart for determining an optimal user digital identity for a candidate item, in accordance with some example embodiments described herein.

In some embodiments, operation 308 may be performed in accordance with the operations described by FIG. 7A. Turning now to FIG. 7A, a procedure 700 illustrates example operations for determining an optimal user digital identity from the one or more user digital identities for each candidate item of the one or more candidate items. As shown by operation 702, the apparatus 200 includes means such as processor 202, memory 204, communications hardware 206, selection engine 212, or the like, for identifying whether a candidate item is associated with a singular digital identity of a plurality of user digital identities. The selection engine 212 may retrieve the generated assignment set from memory 204 to perform operation 702.

As shown by operation 704, the apparatus 200 includes means such as processor 202, memory 204, communications hardware 206, selection engine 212, or the like, for determining the optimal user digital identity from the plurality of user digital identities or as the singular digital identity. In example embodiments, the selection engine 212 identifies a singular digital identity for a candidate item in operation 702, the singular digital identity may be considered as the optimal digital identity for the associated candidate item. In contrast, embodiments wherein the selection engine 212 identifies a plurality of user digital identities for a candidate item, the determination of the optimal user digital identity may occur in accordance with the example operational flow of FIG. 7B.

Figure 7B:
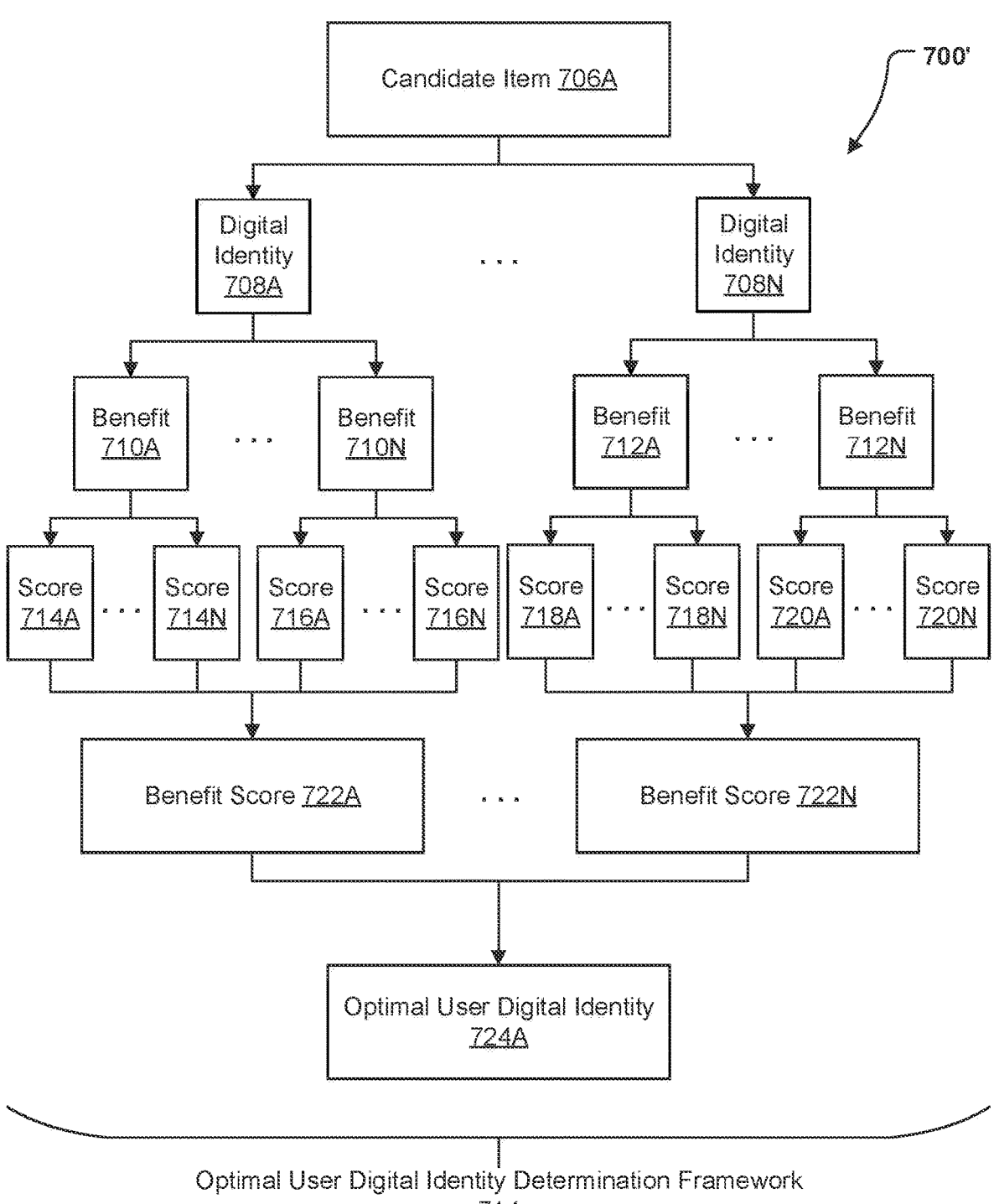
FIG. 7B illustrates a schematic block diagram of an optimal user digital identity determination framework.

FIG. 7B illustrates a schematic block diagram illustrating an example operational flow 700' for the optimal user digital identity determination framework 714, using an example digital identity selection model. The digital identity selection model may operate to identify digital identities with applicable benefits that are in accordance with an establishment's rules or regulations. The optimal user digital identity may be indicative of an optimal item partitioning benefit for a candidate item. In some embodiments, the "optimal" threshold may be determined based on a quantitative benefit (e.g., discounts, rewards, etc.). In other example embodiments, the "optimal" threshold may be determined based on a qualitative benefit (e.g., loyalty benefits, user preferences, etc.). As shown in FIG. 7B, the selection engine 212, based on a generated assignment set for candidate item 706A, has identified a plurality of digital identities 708A-708N. For each identified digital identity, the selection engine 212, in conjunction with the digital identity selection model may extract the one or more benefits 710A-710N and 712A-712N associated with digital identity 708A-708N that offer an item partitioning benefit for the particular candidate item 706A. Upon extraction of the one or more benefits, the digital identity selection model may determine a score 714A-714N that corresponds to benefit 710A, a score 716A-716N that corresponds to benefit 710N, a score 718A-718N that corresponds to benefit 712A, and a score 720A-720N that corresponds to benefit 712N. Each score 714A-714N, 716A-716N, 718A-718N, 720A-720N may correspond to a particular benefit of an identified user digital identity. In some embodiments, the selection engine 212 may provide the individual benefits 710-710N and 712A-712N to the digital identity selection model, that may be configured to parse or identify each benefit corresponding to the digital identity and determine a score for each benefit. Individual score determination for a benefit may involve performing inter-digital identity comparisons and intra-digital identity comparisons between all identified benefits 710-710N and 712A-712N. In some embodiments, score determination may be performed by methods such as: (i) relative ranking (e.g., ranking benefits based on specific criteria), (ii) percentile scoring (e.g., calculating the percentile rank of a benefit compared to other benefits), (iii) performance index (e.g., creating an index that compares the performance of a benefit against a standard), (iv) normalized scoring (e.g., standardize scores based on the distribution of values among benefits), (v) ratio scoring, (vi) comparative grading, (vii) preference scoring, or (viii) paired comparison analysis (e.g., systematically comparing each benefit to every other benefit and assigning scores based on preferences or attributes), etc. In example embodiments, the digital identity selection model may also be configured to use logistic regression, or the like, to (i) assign a particular weight to each score 714A-714N, 716A-716N, 718A-718N, 720A-720N to produce a benefit score 722A-722N that corresponds to a particular digital identity 708A-708N. Various techniques may be employed by the digital identity selection model to perform this operation (e.g., decision trees, random forests, permutation importance, L1 regularization, correlation analysis, statistical tests, etc.). The benefit scores 722A-722N may be representative of the relative optimum ranking of digital identity 708A compared to 708N. In some embodiments, a benefit score 722A may be a quantitative score or qualitative score depending on the type of the candidate item 706A. For example, with a quantitative benefit score, a higher benefit score may be indicative of the associated digital identity being optimal for use in purchasing a particular candidate item, whereas a lower benefit score may be indicative of the associated digital identity comparatively being less optimal. In example embodiments wherein the digital identity selection model generates multiple benefit scores 722A-722N for multiple digital identities 708A-708N, the digital identity selection model may rank the multiple benefit scores to determine the optimal user digital identity 724A for a candidate item 706A.

Returning to FIG. 3, as shown by operation 310, the apparatus 200 includes means such as processor 202, memory 204, communications hardware 206, selection engine 212, or the like, for generating a candidate item partitioning set. In some embodiments, operation 310 may be performed in accordance with the operations described by FIG. 8.

Turning now to FIG. 8, a procedure 800 illustrates example operations for generating a candidate item partitioning set. As shown by operation 802, the apparatus 200 includes means such as processor 202, memory 204, communications hardware 206, selection engine 212, or the like, for selecting an item aggregation type that provides an optimum benefit. The processor 202 may access stored information from memory 204 pertaining to a user profile, which includes user digital identities, associated benefits, optimal user digital identity determined for a candidate item, past transactional behaviors, etc. An item aggregation type may involve two classifications: "bulk transaction" and "individual transaction". For instance, if candidate item 1 and candidate item 2 present a higher combined benefit when purchased together, the selection engine 212 may select an item aggregation type of "bulk" for these items. Conversely, if candidate item 3 offers an exclusive benefit only when purchased individually, the selection engine 212 may select an item aggregation type of "individual" for candidate item 3.

In some embodiments, the selection engine 212 may also perform a recursive exploration of various candidate item combinations to identify the most advantageous item aggregation type for a candidate item. Through iterative analysis, the selection engine 212 may systematically test different selections and combination of candidate items, considering the benefits associated with each digital identity. In some embodiments, this recursive process may be akin to a decision tree, wherein the selection engine 212 evaluates the outcomes of bulk and individual transactions. For example, if the digital identity selection model has identified an optimal user digital identity for candidate item 1, however, there is a second user digital identity that may provide an optimum benefit if candidate item 1 and candidate item 2 are purchased together, the optimal user digital identity for candidate item 1 may be updated in memory 204 via communications hardware 206 to the second user digital identity.

As shown by operation 804, the apparatus 200 includes means such as processor 202, memory 204, communications hardware 206, selection engine 212, or the like, for generating an itemized item set comprising an estimated cost for each candidate item associated with the user. The estimated cost may also include the estimated discount provided for each candidate item based on the selected item aggregation type. In some embodiments, the selection engine 212 may retrieve the selected item aggregation type for a candidate item from memory 204 and perform statistical analyses (e.g., descriptive statistics, regression analysis, cluster analysis, time series analysis, Monte Carlo simulation, decision trees, analysis of variance, principal component analysis, correlation analysis, Bayesian analysis, etc.), to determine the estimated cost for each candidate item. In some embodiments, the selection engine 212 may use communications hardware 206 to retrieve cost information about a candidate item from an establishment device 112A-112N in real-time. For example, if an establishment lists a candidate item for sale at a price of $100 on Black Friday between the hours of 8 am-12 pm, but changes the price of the candidate item to $150 after noon, the selection engine 212 may track and detect this price change to perform the statistical analyses with the updated prices. The selection engine 212 may generate the itemized item set based on the results of the statistical analyses. In some embodiments, the selection engine 212 may format the itemized item set using user-friendly data structures or data structures as dictated by establishment requirements (e.g., array, list, stack, hash table, tree structure, graph, database tables, etc.).

As shown by operation 806, the apparatus 200 includes means such as processor 202, memory 204, communications hardware 206, selection engine 212, or the like, for generating the candidate item partitioning set based on the itemized item set. The generated candidate item partitioning set may be stored in an associated user profile for a future user visit event in memory 204. An example candidate item partitioning set 964 is included as part of a GUI in FIG. 9.

Returning to FIG. 3, as shown by operation 312, the apparatus 200 includes means such as memory 204, communications hardware 206, or the like, for outputting a verification request. In particular, the communications hardware 206 may provide the verification request to the user via one or more user devices 112A-112N using any suitable communication channel (e.g., text message, voice calls, via a corresponding mobile application, and/or the like). The communications hardware 206 may retrieve a verification template stored in memory 204 for generating a verification request for specific scenarios. The verification request may be populated to include the candidate item partitioning set generated for a user visit event, making it relevant and personalized for a particular user. The verification request may be formatted to ensure it is compatible for user devices 112A-112N and appears in a user-friendly manner. This may involve HTML/CSS for web interfaces, text formatting for SMS messages, or rich formatting for mobile applications. In example embodiments, the verification prompt may include localization wherein the verification prompt is adapted to different languages, regions, or cultural norms based on user preferences or system settings of the user device 110A-110N. Accordingly, using communications hardware 206, the verification request may then be displayed to the user device 110A-110N through a web page, mobile app screen, email, text message, or any other channel used for user interaction.

As shown by operation 314, the apparatus 200 includes means such as processor 202, memory 204, communications hardware 206, or the like, for receiving a verification response to the verification request. The verification response may be received from any one of user devices 112A-112N in response to (i) user input approving the generated candidate item partitioning to be used for a transaction, (ii) user input denying that the generated candidate item partitioning set may not be used for a transaction, (iii) user input deferring the generated candidate item partitioning set for a future transaction, (iv) user input denying the generated candidate item partitioning set, wherein the user seeks to modify elements of the generated candidate item partitioning set. In example embodiments in which the user denies the generated candidate item partitioning set and seeks to modify elements of the generated candidate item partitioning set, the communications hardware 206 may unlock the candidate item partitioning set for modification within the same verification request, or may present the user with a secondary verification request to begin the modification process. Upon completion of the user modifications, the communications hardware 206 may output a verification request with the updated candidate item partitioning set. To ensure the security and privacy of the verification response, the communications hardware 206 may encrypt the verification response before transmission over the internet via secure protocols (e.g., HTTPS), to ensure sensitive information is protected from unauthorized access during transit. As such, in example embodiments, the processor 202 may decrypt the data to access the verification response provided by the user. In example embodiments, the processor 202 may process the verification response based on algorithms and methods that are aligned with an establishment's verification requirements.

Turning to FIG. 9, a graphical user interface (GUI) 950 is provided that illustrates an example verification request. As noted previously, a user may interact with the item partitioning benefit optimization system 102 by directly engaging with communications hardware 206 of an apparatus 200 comprising a system device of the item partitioning benefit optimization system 102. In such an embodiment, the GUI shown in FIG. 9 may be displayed to a user by the apparatus 200. Alternatively, a user may interact with the item partitioning benefit optimization system 102 using a separate user device (e.g., any of user devices 112A-112N as shown in FIG. 1), which may communicate with the item partitioning benefit optimization system 102 via communications network 108. In such an embodiment, the GUI shown in FIG. 9 may be displayed to the user by the user device 110A-110N. The verification request 952 may include confirmation options 954-960, pertaining to the user's approval 954, denial 958, deferral 956, or denial with an intent to modify the candidate item partitioning set 964. The verification request 952 may further include a submit option 962 for the user to submit their response.

FIGS. 3-9 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Conclusion

As described above, example embodiments provide technical solutions designed to optimize an item partitioning benefit for a user. Such solutions have not previously been used, and are only achievable by harnessing the computational capabilities and widespread data accessibility offered by modern internet connectivity. Example embodiments address the difficulties associated with manually comparing and selecting digital identities to optimize purchases, thereby avoiding missed opportunities or financial losses resulting from incorrect or suboptimal digital identity choices. Moreover, example embodiments save users time and resources in comparison to other possible approaches because they determine an optimal user digital identity by using a digital identity selection model that uses machine learning. Overall, example embodiments thus enhance the process for the optimization of item partitioning benefits, while eliminating the possibility of human error in instances of manual optimization that would be otherwise unavoidable. Finally, by automating functionality that has historically required human analysis and judgement, the speed and consistency of the evaluations performed by example embodiments unlocks many potential new functions that have historically not been available, such as by identifying an optimal user digital identity in real-time for each candidate item a user selects during a user visit event, that could not historically be accounted for in any systematic fashion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for optimizing an item partitioning benefit for a user, the method comprising:

detecting, by detection circuitry, a user visit event for the user at an establishment, wherein the user visit event is associated with a user attribute set comprising one or more user attributes;

determining, by a multimodal engine and based on the user attribute set, a user digital identity wallet of the user, wherein (a) the digital identity wallet comprises one or more user digital identities, (b) each user digital identity of the one or more user digital identities is associated with a benefit set, and (c) each benefit set comprises one or more benefits;

identifying, by a selection engine, one or more candidate items associated with the user;

determining, by the selection engine and using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item, and wherein the digital identity selection model is a trained machine learning model which was trained on at least one historical attribute set that includes at least one historical attribute associated with at least one historical user;

generating, by the selection engine and using the digital identity selection model, a candidate item partitioning set comprising each candidate item from the one or more candidate items linked to the optimal user digital identity determined for the corresponding candidate item; and outputting, by communications hardware, a verification request, wherein the verification request includes the generated candidate item partitioning set.

2. The method of claim 1, wherein detecting the user visit event further comprises:

analyzing, by the detection circuitry, user visit event data; and generating, by the detection circuitry and based on the user visit event data, the user attribute set.

3. The method of claim 1, wherein determining the digital identity wallet further comprises:

generating, by the multimodal engine and based on the user attribute set, the user digital identity wallet, wherein the user digital identity wallet comprises one or more user digital identities of the user; and storing, by the multimodal engine, the generated digital identity wallet in an associated user profile.

4. The method of claim 1, wherein identifying one or more candidate items associated with the user further comprises:

querying, by the selection engine, the user digital identity wallet to determine the one or more user digital identities associated with the one or more benefits under which one or more of the one or more candidate items are eligible; and generating, by the selection engine, an assignment set, wherein the assignment set associates each candidate item to one or more of the one or more user digital identities associated with the benefit under which the candidate items is eligible.

5. The method of claim 1, wherein determining the optimal user digital identity further comprises:

identifying, by the selection engine and using the digital identity selection model, whether a candidate item is associated with a singular digital identity or a plurality of user digital identities, wherein in an instance in which the candidate item is associated with a singular digital identity, the digital identity selection model determines the optimal user digital identity to be the singular user digital identity.

6. The method of claim 5, wherein in an instance in which the candidate item is associated with a plurality of digital identities, the method further comprises:

calculating, by the selection engine and using the digital identity selection model, a benefit score for each user digital identity associated with the candidate item, wherein the benefit score comprises at least one of a quantitative metric score or a qualitative metric score; and determining, by the selection engine and using the digital identity selection model and based on the calculated benefit score, the optimal user digital identity for the candidate item that provides the optimal benefit.

7. The method of claim 1, wherein generating the candidate item partitioning set, further comprising:

selecting, by the selection engine and using the digital identity selection model, an item aggregation type providing an optimum benefit, wherein the item aggregation type is at least one of a bulk transaction or an individual transaction for each candidate item;

generating, by the selection engine and using the digital identity selection model and based on the selected item aggregation type, an itemized item set comprising an estimated cost for each candidate item from the one or more candidate items associated with the user; and generating, by the selection engine and using the digital identity selection model, the candidate item partitioning set based on the itemized item set.

8. The method of claim 1, further comprising:

receiving, by communications hardware, a verification response to the verification request, wherein the verification response comprises (i) a confirmation status indicative of a user approval of the generated candidate item partitioning set, (ii) a denial status indicative of a user denial of the generated candidate item partitioning set, or (iii) a pending status indicative of a user deferral of the generated candidate item partitioning set.

9. An apparatus for optimizing an item partitioning benefit for a user, the apparatus comprising:

detection circuitry configured to:

detect a user visit event for the user at an establishment, wherein the user visit event is associated with a user attribute set, wherein the user attribute set comprises one or more user attributes;

a multimodal engine configured to:

determine, based on the user attribute set, a user digital identity wallet of the user, wherein (a) the user digital identity wallet comprises one or more user digital identities, (b) each user digital identity of the one or more user digital identities is associated with a benefit set, and (c) each benefit set comprises one or more benefits;

a selection engine configured to:

identify one or more candidate items associated with the user, determine, using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item, and wherein the digital identity selection model is a trained machine learning model which was trained on at least one historical attribute set that includes at least one historical attribute associated with at least one historical user, and generate, using the digital identity selection model, a candidate item partitioning set comprising each candidate item from the one or more candidate items linked to the optimal user digital identity determined for the corresponding candidate item; and communications hardware configured to:

output a verification request, wherein the verification request includes the generated candidate item partitioning set list.

10. The apparatus of claim 9, wherein the detection circuitry is further configured to:

analyze user visit event data; and generate based on the user visit event data, the user attribute set.

11. The apparatus of claim 9, wherein the multimodal engine is further configured to:

generate, based on the user attribute set, the user digital identity wallet, wherein the user digital identity wallet comprises one or more user digital identities store the generated digital identity wallet in an associated user profile.

12. The apparatus of claim 9, wherein the selection engine is further configured to:

query the user digital identity wallet to determine the one or more user digital identities associated with the benefit under which one or more of the one or more candidate items are eligible; and generate an assignment set, wherein the assignment set associates each candidate item to one or more of the one or more user digital identities associated with the one or more benefits under which the candidate items is eligible.

13. The apparatus of claim 9, wherein the selection engine is further configured to:

identify, using the digital identity selection model, whether a candidate item is associated with a singular digital identity or a plurality of user digital identities, wherein in an instance in which the candidate item is associated with a singular digital identity, the digital identity selection model determines the optimal user digital identity to be the singular user digital identity.

14. The apparatus of claim 9, wherein the selection engine is further configured to:

calculate, using the digital identity selection model, a benefit score for each user digital identity associated with the candidate item, wherein the benefit score comprises at least one or a quantitative metric score or a qualitative metric score; and determine, using the digital identity selection model and based on the calculated benefit score, the optimal user digital identity for the candidate item that provides the optimal benefit.

15. The apparatus of claim 9, wherein the communications hardware is further configured to:

receive a verification response to the verification request, wherein the verification response comprises (i) a confirmation status indicative of a user approval of the generated candidate item partitioning set, (ii) a denial status indicative of a user denial of the generated candidate item partitioning set, or (iii) a pending status indicative of a user deferral of the generated candidate item partitioning set.

16. A computer program product for optimizing an item partitioning benefit for a user, the computer program product comprising at least one non-transitory computer readable storage medium storing software instructions that, when executed, cause an apparatus to:

detect a user visit event for the user at an establishment, wherein the user visit event is associated with a user attribute set, wherein the user attribute set comprises one or more user attributes;

determine, based on the user attribute set, a user digital identity wallet of the user, wherein (a) the digital identity wallet comprises one or more user digital identities, (b) each user digital identity of the one or more user digital identities is associated with a benefit set, and (c) each benefit set comprises one or more benefits;

identify one or more candidate items associated with the user;

determine, using a digital identity selection model, an optimal user digital identity from the one or more user digital identities for each candidate item of the one or more candidate items, wherein (a) the digital identity selection model determines an optimal user digital identity for a candidate item based on the benefit set associated with the optimal user digital identity and (b) the optimal user digital identity is indicative of an optimal item partitioning benefit for each candidate item, and wherein the digital identity selection model is a trained machine learning model which was trained on at least one historical attribute set that includes at least one historical attribute associated with at least one historical user;

generate, using the digital identity selection model, a candidate item partitioning set comprising each candidate item from the one or more candidate items linked to the optimal user digital identity determined for the corresponding candidate item; and output a verification request, wherein the verification request includes the generated candidate item partitioning set.

17. The computer program product of claim 16, wherein the software instructions, when executed, further cause the apparatus to:

generate, by the multimodal engine and based on the user attribute set, the user digital identity wallet, wherein the user digital identity wallet comprises one or more user digital identities of the user; and store the generated digital identity wallet in an associated user profile.

18. The computer program product of claim 16, wherein the software instructions, when executed, further cause the apparatus to:

query the user digital identity wallet to determine the one or more user digital identities associated with the one or more benefits under which one or more of the one or more candidate items are eligible; and generate an assignment set, wherein the assignment set associates each candidate item to one or more of the one or more user digital identities associated with the benefit under which the candidate items is eligible.

19. The computer program product of claim 16, wherein the software instructions, when executed, further cause the apparatus to:

identify, using the digital identity selection model, whether a candidate item is associated with a singular digital identity or a plurality of user digital identities, wherein in an instance in which the candidate item is associated with a singular digital identity, the digital identity selection model determines the optimal user digital identity to be the singular user digital identity.

20. The computer program product of claim 16, wherein the software instructions, when executed, further cause the apparatus to:

select using the digital identity selection model, an item aggregation type providing an optimum benefit, wherein the item aggregation type is at least one of a bulk transaction or an individual transaction for each candidate item;

generate, using the digital identity selection model and based on the selected item aggregation type, an itemized set comprising an estimated cost for each candidate item from the one or more candidate items associated with the user;

generate, using the digital identity selection model, the candidate item partitioning set based on the itemized item set.

* * * * *